Aug. 9, 1932.  H. F. KHOENLE  1,871,377

TROLLING SPOON

Filed Oct. 3, 1930

INVENTOR
HERMAN F. KHOENLE

BY

ATTORNEYS

Patented Aug. 9, 1932

1,871,377

UNITED STATES PATENT OFFICE

HERMAN F. KHOENLE, OF AKRON, OHIO, ASSIGNOR TO THE ENTERPRISE MANUFACTURING COMPANY, OF AKRON, OHIO, A CORPORATION OF OHIO

TROLLING SPOON

Application filed October 3, 1930. Serial No. 486,163.

The present invention relates to the spoon type of artificial bait and particularly, though not necessarily, to the larger spoons for use in salt water fishing, as in trolling for salmon or similar species of fish. The object of the invention is to improve upon this type of bait so as to secure new and novel results when the spoon is operated.

The spoon shown and described herein has a peculiar and distinctive action in the water, which makes it very effective as a lure or bait. This action consists in the combination of a comparatively fast, sideways rocking movement with a sharp pivotal or oscillating movement about a center located in the front end of the spoon. The combination of these two actions gives the spoon the lifelike appearance in the water, which makes it attractive as a bait.

In addition to the effective action of the bait in the water, it has the advantageous characteristic of not turning over at any practical trolling speed. This is a considerable advantage over previously designed spoons of this general type which have a tendency to turn over during trolling. The spoon of this invention will not rise to the surface, but will retain a substantially horizontal path in the water at a given depth below the surface. The pivotal center of movement, which is at or near the front end of the spoon, will move in a substantially straight line and the spoon will not have a lateral or darting movement.

Another advantage of the new form of spoon is that it is easily cleaned as it does not present any sharp corners or other formations in which the spoon will tarnish and as the brilliancy of a trolling spoon seems to constitute one of the principal elements of its attractiveness, this is a considerable advantage.

The invention resides in the peculiar shape or configuration of the spoon, which gives the several advantages which have been stated above. It will be apparent, however, that exact conformity with the details of the design are not necessary for the practising of the invention, and changes and modifications may be made within the scope of the invention and the claims appended hereto.

In the drawing, in which the best known or preferred form of the invention is shown:

Figure 1:
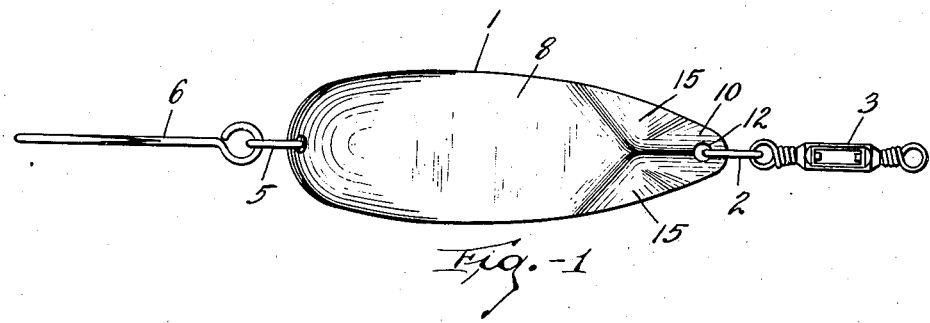
Figure 1 is a plan view of the spoon embodying the invention herein.
Figure 2:
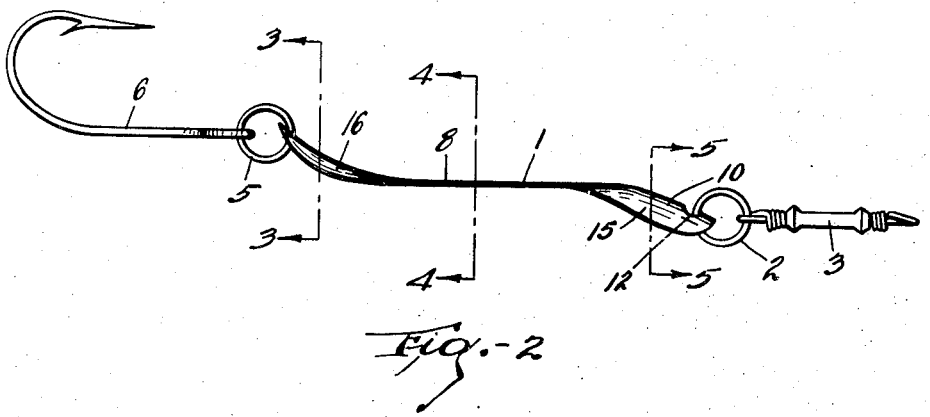
Figure 2 is a side view.
Figure 3:
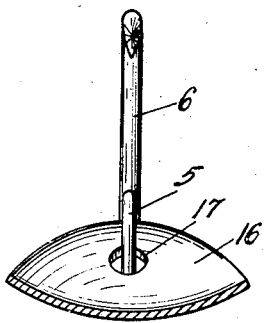
Figure 4:
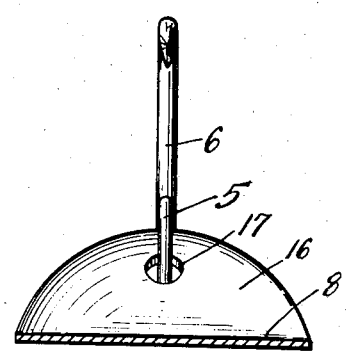
Figure 5:
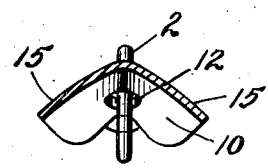

Figures 3, 4 and 5 are sectional views, respectively, on the lines 3—3, 4—4 and 5—5 of Figure 2.

The spoon comprises a generally oval-shaped metal body indicated by the numeral 1. This body is usually given a bright reflecting finish, although it may be colored or ornamented in any manner which may be desired. To the forward or front end of the spoon is attached a ring 2 for connection with the usual swivel 3 to which the line is secured. At the rear end of the spoon is a second ring 5 on which the hook 6 is carried. The spoon is oval throughout, having no straight edge portions.

Referring to the details of the design of the spoon, it will be noted that the central area 8 of the spoon body is flat from edge to edge and this central area extends over a very considerable or major proportion of the total spoon area. This flattened area is an important feature of the spoon design as it presents a plane surface of relatively large extent, which tends to ride in a horizontal plane and while it apparently does not interfere with the rocking movement of the spoon, it does prevent the spoon from turning over in the water. It will also be observed that this flat area is extended along the central axis of the spoon toward each end thereof.

At the front or prow end of the spoon, the metal of the body portion is bent downwardly and inwardly from either side so as to form a prow or nose 10 which is below the plane of the spoon body and which is rounded or substantially U-shaped in cross-section, the ring 2 being located in an aperture 12 formed in the ridge portion of the prow. The metal at either side of the prow will form wings 15 serving to guide the front end of the spoon. The prow is bent downwardly slightly as shown in the side elevation in Figure 2, and as a result of the design, the spoon is kept at the proper distance below the surface. This action is also due to the fact that the ring 2 and its point of attachment is above the end of the prow and as the line of pull is, therefore, above the tip of the prow, the forward end of the spoon will tend to dive, which will react to keep the spoon below the surface of the water.

The rear end of the spoon is curved upwardly to form a concavo-convex wall 16 about the rear of the spoon and in this wall is located the aperture 17 for the reception of the ring 5.

When the spoon is drawn through water, it will rock and at the same time will oscillate about a point in the prow so that the action of the spoon will simulate the movements of fish. While the continued movement is vigorous and snappy, the spoon does not dart from side to side but moves in a generally straight line, which is a desirable quality of the spoon. It will not rise to the surface when drawn at any practicable trolling speed and shows no tendency to turn over. The hook is, therefore, presented in the most effective position.

The advantages and benefits of the invention will be found to have been attained by the especial and peculiar design of the spoon, which it is the purpose of the patent to cover, in the exact form shown and in modifications or variations thereof.

What is claimed is:

1. A trolling spoon comprising a body portion, the forward end of which is bent downwardly from the plane of the spoon and inwardly from the sides to form a downwardly open ridge-like prow and the rear end of which has its margins curved upwardly in a concave wall, the central portion of the spoon being substantially flat from edge to edge, and means for attaching a line and hook to the ends of the spoon respectively.

2. A trolling spoon comprising a body portion, the forward end of which is bent downwardly from the plane of the spoon and inwardly from the sides to form a ridge-like prow and the rear end of which is curved upwardly in a concave wall, the central portion of the spoon being substantially flat from edge to edge, the said flattened area being elongated in both directions along the central axis of the spoon, and means for attaching a line and hook to the ends of the spoon respectively.

3. A trolling spoon comprising a body portion, the forward end of which is bent downwardly from the plane of the spoon and inwardly from the sides to form a ridge-like prow and the rear end of which is curved upwardly in a concave wall, the central portion of the spoon being substantially flat from edge to edge, the said flattened area being elongated in both directions along the central axis of the spoon, and means for attaching a line and hook to the ends of the spoon respectively, the said line and hook attaching means being located on the central axis of the spoon.

4. A trolling spoon comprising a body portion, the forward end of which is bent downwardly from the plane of the spoon and inwardly from the sides to form a ridge-like prow and the rear end of which is curved upwardly in a concave wall, the central portion of the spoon being substantially flat from edge to edge, and means for attaching a line and hook to the ends of the spoon respectively, the point of line attachment being above the tip of the prow.

5. A trolling spoon comprising a body portion, the forward end of which is bent downwardly from the plane of the spoon to provide a downwardly and forwardly inclined rib, which maintains the spoon at a uniform depth during trolling and inwardly from the sides to form a ridge-like prow and the rear end of which is curved upwardly in a concave wall, and means for attaching a line and hook to the ends of the spoon respectively.

HERMAN F. KHOENLE.